July 24, 1934.     A. J. MEYER     1,967,446

ENGINE

Original Filed June 11, 1929

INVENTOR.
Andre J. Meyer
BY
ATTORNEY.

Patented July 24, 1934

1,967,446

UNITED STATES PATENT OFFICE 1,967,446

ENGINE

Andre J. Meyer, Detroit, Mich., assignor to Continental Motors Corporation, Detroit, Mich., a corporation of Virginia Original application June 11, 1929, Serial No. 370,085. Divided and this application April 17, 1930, Serial No. 445,173

19 Claims. (Cl. 74—6)

This invention relates to engines and refers more particularly to vibration dampers for crankshafts of engines particularly of the internal combustion type. My invention provides improvements over the well known "Lanchester" damper and like the Lanchester damper is adapted for cooperation with the usual flywheel at the rear of the crankshaft. My damper in the embodiment illustrated is adapted to be located at the crankshaft front end and is designed to damp the torsional vibrations of the crankshaft, these vibrations being objectional especially in multi-cylinder internal combustion engines such as are commonly used for propelling motor vehicles.

Heretofore in dampers of the aforesaid type, the auxiliary damper flywheel is yieldingly connected to the crankshaft, a spring regulating and determining the amount of friction resistance to yielding in the damping operation. I have determined that this device is unsatisfactory as ordinarily constructed in that the damper does not function properly for the range of speeds ordinarily experienced in engines of the character referred to. The spring or springs heretofore used if set properly for damping low speed high frequency crankshaft vibrations will be too stiff for properly damping high speed low frequency vibrations. As a result the usual dampers are inefficient and unsatisfactory.

One object of my invention resides in the provision of a damper which will properly damp the vibrations over the whole range of speeds. A further object resides in the provision of an improved damper of simple construction capable of manufacture at low cost.

This application is a division of my co-pending application Ser. No. 370,085, filed June 11, 1929.

Figure 1:
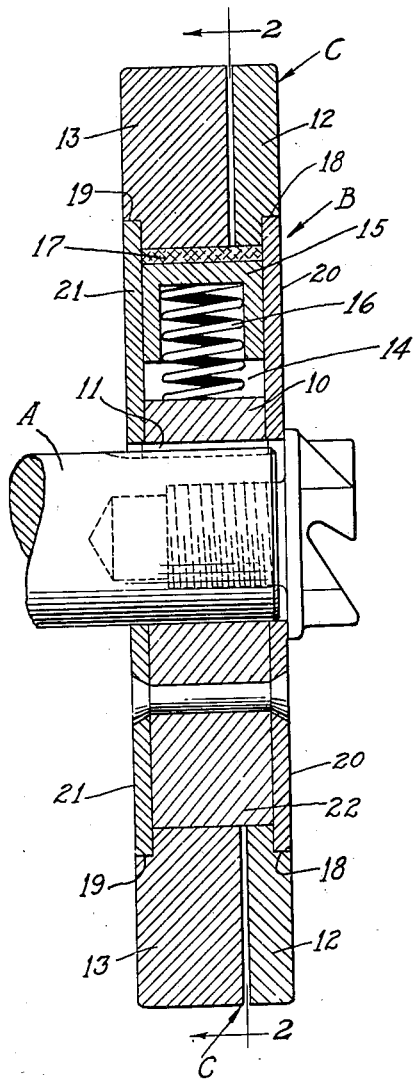
Figure 2:
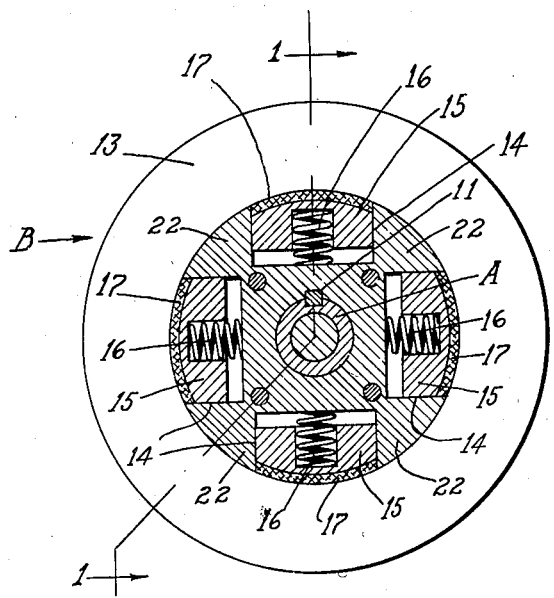

Further features and advantages of my invention will be apparent from the following description of the details of construction illustrated in the accompanying drawing in which, Fig. 1 is a sectional view of my improved damper taken substantially on the line 1—1 of Fig. 2, and Fig. 2 is a sectional view taken on the line 2—2 of Fig. 1.

Reference character A represents the crankshaft front end and B my damper mounted thereon. The damper comprises a driving hub 10 keyed at 11 to the crankshaft, the flywheel structure C comprising flywheel portions 12 and 13 of different mass or inertia, the purpose of which will be presently apparent. The hub 10 is provided with a plurality of spaced recesses or pockets 14 about its periphery in which shoes 15 are supported and adapted to move radially with respect to the hub. Springs 16 seated against the bottom of each recess or pocket 14 are adapted to act radially against the shoes 15, friction material 17 carried by the outer surface of each shoe being adapted to engage the inner peripheral surface of the flywheel portions 12 and 13, the springs exerting a force to yieldingly engage the shoes with the flywheel portions. It will be noted that the shoes are located intermediate the flywheel portions and the hub and are disposed about the periphery of the hub. Furthermore, it may be noted that these shoes are substantially evenly spaced about the periphery of the hub.

The flywheel portions are arranged to be loosely centered by shoulders 18 and 19 and end plates 20 and 21, assisted somewhat by the hub portions 22. The flywheel portions are thus mounted coaxial with the hub and independently journaled thereon to rotate about the hub, thereby permitting the flywheel portions to rotate about the hub relative to each other. Each flywheel portion is subjected to substantially the same spring force for yieldingly connecting the same with the hub, since the shoes and friction material carried thereby are sufficiently wide to engage both flywheel portions.

In operation, the hub 10 rotates in fixed relation to the crankshaft A, while the flywheel structure C is rotated therewith by reason of the friction material 17 secured to the periphery of the shoes. When the crankshaft is free from the angular vibrations, either positive or negative, the flywheel structure C rotates as a unit with the hub 10. However, when the crankshaft tends to quickly change its angular velocity as in torsional vibrations, the inertia of the flywheel tends to oppose such changes and the vibrations are thus damped out or dissipated.

In considering the action of my damper, it will be noted that the product of its mass moment of inertia I and the angular acceleration $\theta$ will increase as the angular acceleration increases and there will be some value of $\theta$ where this product will equal the friction moment M of the damper, this friction moment being a constant, determined by the tension of the springs 16 and the effectiveness of the friction material 17. For such value of $\theta$—$M=I$.

From this it will be noted that for a higher value of $\theta$ a lower value of I will overcome the friction moment M. Of course if a high value of I is available then the friction moment M will also be overcome. Therefore at low speeds where $\theta$ is high both flywheel portions 12 and 13 will slip together. At high speed where $\theta$ is much smaller the flywheel portion 12 of relatively small mass remains stationary relative to the crankshaft and the flywheel portion 13 of relatively great mass will slip alone.

Heretofore with the single flywheel construction the proportion of inertia to friction moment is determined experimentally at high speed. A damper so made will be active at all speeds. However, the friction torque is insufficient to take care of the high energy of the high frequency vibrations at low speeds. My invention supplies additional friction moment when high frequency vibrations occur, and with my damper the whole speed range is adequately provided for.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A vibration damper of the character described comprising a driving hub, driven flywheel members independently journaled for rotation about said hub, a shoe, slidably supported intermediate the hub and said members, and a spring between the hub and shoe exerting a yielding pressure on said members.

2. A vibration damper of the character described comprising a driving hub, driven flywheel members of different mass journaled for rotation about said hub, means carried by the hub and adapted for engagement with said members, and means exerting a substantial uniform yielding pressure on the first said means to yieldingly connect said flywheel members to said driving hub.

3. A vibration damper of the character described comprising a driving hub, driven flywheel members of different mass journaled for rotation about said hub, means disposed about the periphery of said hub and adapted for engagement with said members, and means exerting a substantial uniform yielding pressure on the first said means to yieldingly connect said flywheel members to said driving hub.

4. A vibration damper of the character described comprising a driving hub, driven flywheel members of different mass journaled for rotation about said hub, a plurality of segmental means disposed about the periphery of said hub and adapted for engagement with said members, and means exerting a substantial uniform yielding pressure on said segmental means, to yieldingly connect said flywheel members to said driving hub.

5. A vibration damper of the character described comprising a driving hub, driven flywheel members of different mass journaled for rotation about said hub, a plurality of evenly spaced separate segmental means disposed about the periphery of said hub and adapted for engagement with said members, and means exerting a substantial uniform yielding pressure on each of said segmental means to yieldingly connect said flywheel members to said driving hub.

6. A vibration damper of the character described comprising a driving hub, driven flywheel members journaled for rotation about said hub, means disposed about the periphery of said hub and adapted for engagement with said members, and means exerting a yielding force radially outwardly on the first said means to yieldingly connect said flywheel members to said driving hub.

7. A vibration damper of the character described comprising a driving hub, driven flywheel members journaled for rotation about said hub, a plurality of evenly spaced segmental means disposed about the periphery of said hub and adapted for engagement with said members and a spring associated with each segmental means for exerting a force radially outwardly on same to yieldingly connect said flywheel members to said driving hub.

8. In a vibration damper for engine crankshafts, a driving hub fixed with the crankshaft, flywheel members of different inertia, means carried by the hub and adapted for engagement with said members, and means exerting a yielding pressure on the first said means to yieldingly connect said flywheel members to said driving hub, one of said flywheel members being adapted to dampen vibrations independently of the other.

9. In a vibration damper for engine crankshafts, a driving hub fixed with the crankshaft, flywheel members of different inertia, means disposed about the periphery of said hub and engaged with said flywheel members, and means exerting a yielding pressure on the first said means to yieldingly connect said flywheel members to said driving hub, one of said flywheel members being adapted to dampen vibrations independently of the other.

10. In a vibration damper for engine crankshafts, a driving hub fixed with the crankshaft, flywheel members of different inertia independently journaled for rotation about said hub, and means intermediate the flywheel members and hub and disposed about the periphery of the hub for yieldingly connecting the flywheel members with the crankshaft.

11. In a vibration damper for engine crankshafts, a driving hub fixed with the crankshaft, a flywheel structure including independent portions of different inertia, and means intermediate the flywheel structure and hub and disposed about the periphery of the hub for yieldingly connecting the flywheel structure with the crankshaft.

12. In a vibration damper for engine crankshafts, a driving hub fixed with the crankshaft, flywheel portions of different inertia, and means intermediate the flywheel portions and hub and disposed about the periphery of the hub for yieldingly connecting the flywheel with the crankshaft, one of said flywheel portions being adapted to dampen vibrations independently of another of said flywheel portions.

13. In a vibration damper for engine crankshafts, a driving hub fixed with the crankshaft, flywheel portions of different inertia, spring actuated means intermediate the flywheel portions and hub and disposed about the periphery of the hub for yieldingly connecting the flywheel portions with said driving hub, said flywheel portions being subjected to substantially the same spring yielding force.

14. In a vibration damper for engine crankshafts, a driving hub fixed with the crankshaft, a member of relatively small mass adapted to dampen high frequency torsional vibrations, a second member of relatively great mass adapted to dampen low frequency torsional vibrations, and means intermediate said members and hub and disposed about the periphery of the hub for yieldingly connecting the said members with the driving hub.

15. In a vibration damper for engine crankshafts, a driving hub fixed to the crankshaft, a member of relatively small mass adapted to dampen high frequency torsional vibrations, a second member of relatively great mass adapted to dampen low frequency torsional vibrations, and means intermediate said members and hub and disposed about the periphery of the hub for yieldingly connecting the said members with the driving hub, said connecting means including a spring whereby substantially the same yielding force on said members is exerted radially outwardly with respect to the crankshaft axis.

16. In a vibration damper for engine crankshafts, a driving hub fixed with the crankshaft, driven flywheel members coaxial with the hub and relatively rotatable with respect to each other about the crankshaft, and means intermediate the flywheel members and hub and disposed about the periphery of the hub for yieldingly connecting the flywheel members with the hub, the inertia of one of said flywheel members differing from that of the other.

17. A vibration damper comprising a driving hub, driven flywheel members of different inertia independently journaled for rotation about said hub, and a plurality of segmental means carried by said hub and movable radially with respect to the longitudinal axis of said hub, a spring associated with each of said segmental means for exerting a force directed radially outwardly against said segmental means for yieldingly connecting the said flywheel members and hub.

18. In an engine crankshaft vibration damper, a driving hub fixed to the crankshaft, driven flywheel members one of relatively great mass and another of relatively small mass and independently journaled for rotation about said hub, a shoe intermediate the hub and said flywheel members, and a spring between the hub and shoe exerting a yielding pressure for yieldingly connecting the flywheel members with the hub, said flywheel members cooperating to damp vibrations at relatively low speeds and the flywheel member of relatively great mass acting to damp vibrations at relatively high speeds independently of the other flywheel member.

19. A vibration damper comprising a driving hub, flywheel portions of different inertia journaled for rotation about said hub and axially spaced with respect to each other, means carried by said hub and adapted for engagement with both said flywheel portions, and spring means exerting a yielding force radially outwardly on said first mentioned means to yieldingly connect said flywheel portions to said driving hub, said flywheel portions adapted for relative angular movement during damping action.

ANDRE J. MEYER.